United States Patent
Dorsch et al.

(10) Patent No.: US 7,628,183 B2
(45) Date of Patent: Dec. 8, 2009

(54) SURFACE FOAM DIFFUSER SYSTEM

(75) Inventors: Glenn R. Dorsch, Aberdeen, WA (US); Kent H. Keeran, Elma, WA (US)

(73) Assignee: Vaughan Co., Inc., Montesano, WA (US)

( * ) Notice: Subject to any disclaimer, the term of this patent is extended or adjusted under 35 U.S.C. 154(b) by 365 days.

(21) Appl. No.: 11/522,106

(22) Filed: Sep. 15, 2006

(65) Prior Publication Data

US 2007/0068597 A1    Mar. 29, 2007

Related U.S. Application Data

(60) Provisional application No. 60/717,718, filed on Sep. 16, 2005.

(51) Int. Cl.
*B65B 1/04* (2006.01)
*B05B 3/02* (2006.01)

(52) U.S. Cl. .................. 141/286; 141/285; 239/222.11

(58) Field of Classification Search .................. 141/286; 239/222.11, 223; 222/565
See application file for complete search history.

(56) References Cited

U.S. PATENT DOCUMENTS

| | | | | | |
|---|---|---|---|---|---|
| 598,601 | A | * | 2/1898 | Higbee | 239/511 |
| 816,897 | A | * | 4/1906 | Bray | 406/161 |
| 2,639,191 | A | * | 5/1953 | Hruby, Jr. | 239/231 |
| 2,813,402 | A | * | 11/1957 | Poethig et al. | 137/109 |
| 2,944,701 | A | * | 7/1960 | Hatanaka | 220/86.1 |
| 3,101,174 | A | * | 8/1963 | Loveland | 239/27 |
| 4,327,867 | A | * | 5/1982 | Jones et al. | 239/214.23 |
| 5,165,246 | A | * | 11/1992 | Cipolla et al. | 62/47.1 |
| 5,314,121 | A | * | 5/1994 | Buss et al. | 239/553.3 |
| 5,860,460 | A | * | 1/1999 | Hidano et al. | 141/286 |
| 6,058,968 | A | * | 5/2000 | Carter | 137/561 A |

* cited by examiner

*Primary Examiner*—Timothy L Maust
(74) *Attorney, Agent, or Firm*—Seyfarth Shaw LLP (57) ABSTRACT

A nozzle ejects a liquid stream generally horizontally inward from a location near the periphery of a tank, and fairly close to the upper surface of liquid in the tank. The liquid stream impinges on a splash plate or deflector to break the liquid stream into a reasonably uniform dispersion of droplets over a substantial area of the surface of the liquid in the tank, which reduces the surface foam.

15 Claims, 7 Drawing Sheets

SURFACE FOAM DIFFUSER SYSTEM

CROSS-REFERENCE TO RELATED APPLICATION

This application claims the benefit of Provisional Application No. 60/717,718, filed Sep. 16, 2005, the disclosure of which is hereby incorporated by reference.

BACKGROUND

Surface foaming can be a problem in storage and treatment tanks where large volumes of liquid/slurry are stored and stirred, mixed, or agitated. For example, in activated sludge secondary treatment plants, slurries in the tank are stirred, mixed, or agitated in order to suspend solids in the liquid prior to emptying the tank. Similarly, surface foaming can be a problem in anaerobic digesters. The foam may take the form of bubbles and/or scum on the surface of the liquid/slurry in the tank. If the foaming problem is not addressed, the foam uses up volume in the tank, or the tank can overflow.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention pertains to a droplet creation and broadcast system for defoaming a large area of the surface of a liquid, sludge, slurry, etc., in a tank. More specifically, the present invention relates to a system for broadcasting droplets of the tank liquid from a pressurized liquid nozzle.

In one aspect of the invention, the liquid stream from the nozzle outlet is directed radially inward, preferably from a location near the periphery of the tank and fairly close to the upper surface of the liquid. The liquid stream impinges on a splash plate or deflector to break the liquid stream into a reasonably uniform dispersion of droplets over a substantial area of the surface of the liquid in the tank, which reduces the surface foam.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The drawings illustrate a specific embodiment of the invention as used in a specific tank construction, but principles of the invention can be used for virtually any storage tank in which surface foam (including scum) may cause a problem. In the embodiment illustrated in FIG. 1, a tank 10 includes a lid 12 and a conical base 14. The representative embodiment is used for a digester tank having a radius of 45 feet (dimension A in FIG. 2), bottom cone of 3½ feet depth, overall depth from the bottom sidewall of 30 to 50 feet, and mixing system including a chopper pump 16 and nozzle assemblies 18 such as those available from Vaughan Co., Inc., of Montesano, Wash., and sold under the trademark ROTAMIX®). The nozzle assemblies 18 can include an inner ring of nozzles and an outer ring of nozzles oriented in the same rotational direction to induce rotation of the contents of the tank about the vertical axis 20. The pump outlet is connected to a supply pipe 22 feeding the surface foam diffuser 24 in accordance with the present invention. As described in more detail below, the diffuser 24 can be conveniently mounted in a manhole 26 of the type commonly used in tanks of this type. In the illustrated embodiment, the manhole 26 is located 24½ feet (dimension B in FIG. 2) from the tank center. This location varies depending on the tank. The present invention can be installed to achieve its defoaming effect wherever it is needed. The manhole cover is replaced by the diffuser. Appropriate valves are provided at the pump 16 for directing liquid from the tank to the pipe 22 and/or supply pipes 28 for the mixing system nozzle assemblies. Liquid from the tank is supplied to the pump inlet by inlet piping (represented by the broken line L FIG. 2) which can withdraw liquid from the lower center portion of the tank and extend to the pumps 16.

Figure 1:
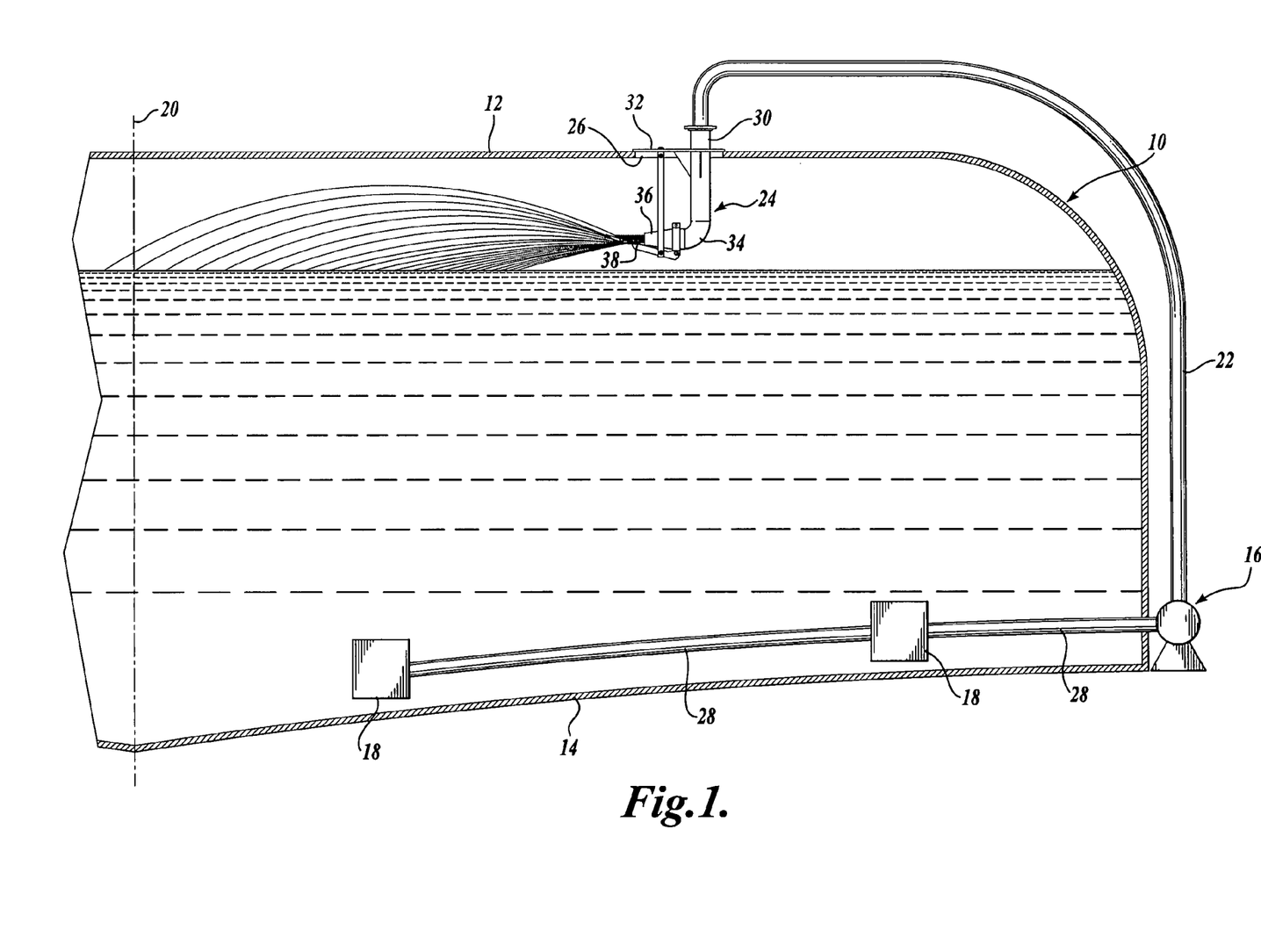
FIG. 1 is a diagrammatic side elevation of a surface foam diffuser system in accordance with the present invention, and a fragment of a representative tank in which the system may be used.
Figure 2:
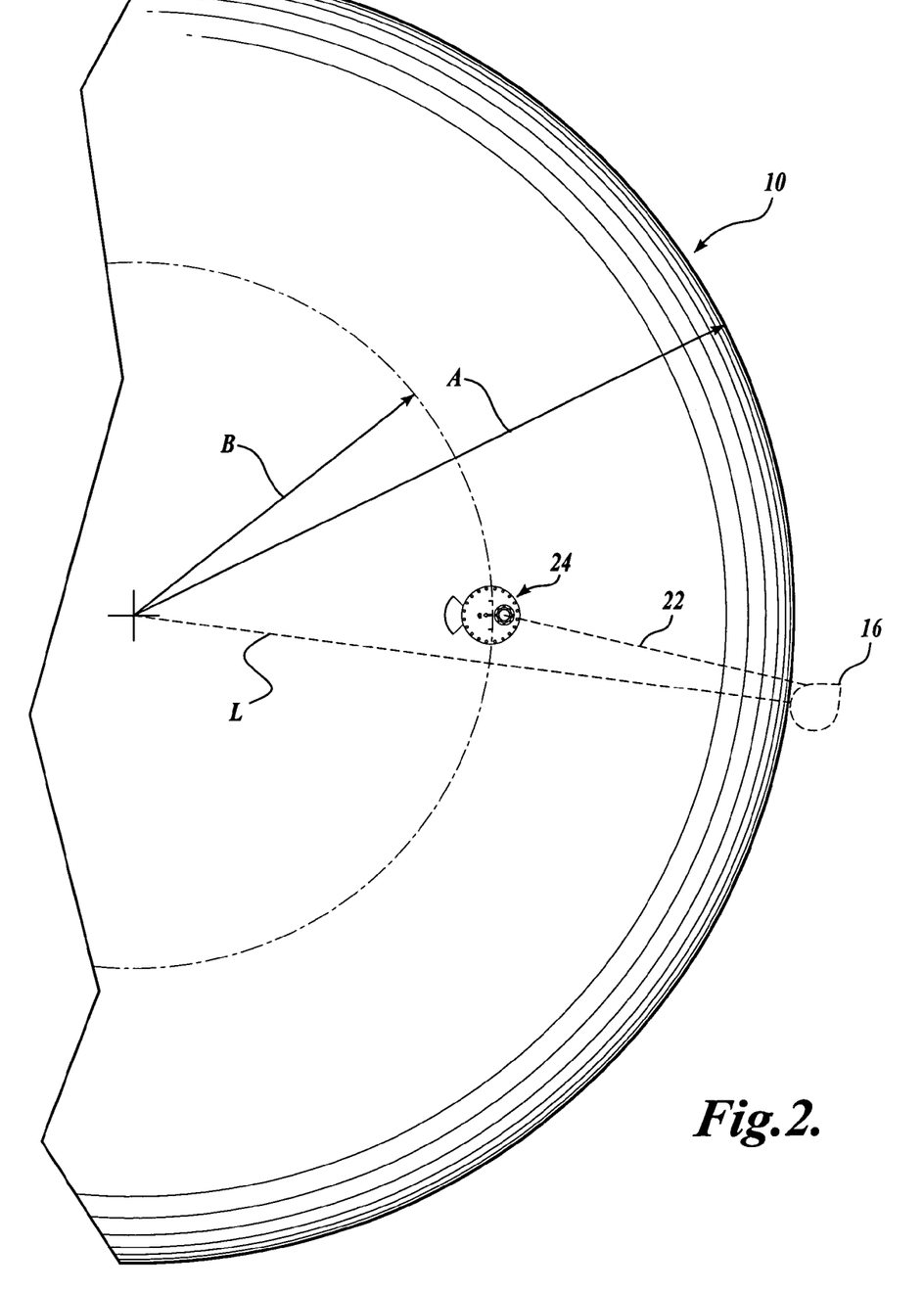
FIG. 2 is a diagrammatic top plan of the system of FIG. 1.

Referring to FIG. 1, supply pipe 22 (6-inch diameter in a representative embodiment) connects to the upright diffuser inlet pipe 30. Pipe 30 extends downward through a cover plate 32, by which the diffuser 24 is mounted in the manhole 26, to a 90° elbow 34. Elbow 34 leads to a tapered nozzle 36 which can be pointed inward toward the center of the tank. The nozzle outlet is sized for a desired concentration of the liquid ejected from the nozzle, and can be 1½ inches to 2½ inches in diameter for a representative installation. The horizontally directed stream of liquid impinges on a splash plate or deflector 38 of the design, described in detail below, to break the liquid stream into a reasonably uniform dispersion of droplets over a substantial area of the surface of the liquid in the tank without a great upward arc which would contact the lid of the tank or require that liquid be maintained at a lower level, thereby wasting room in the tank.

Figure 3:
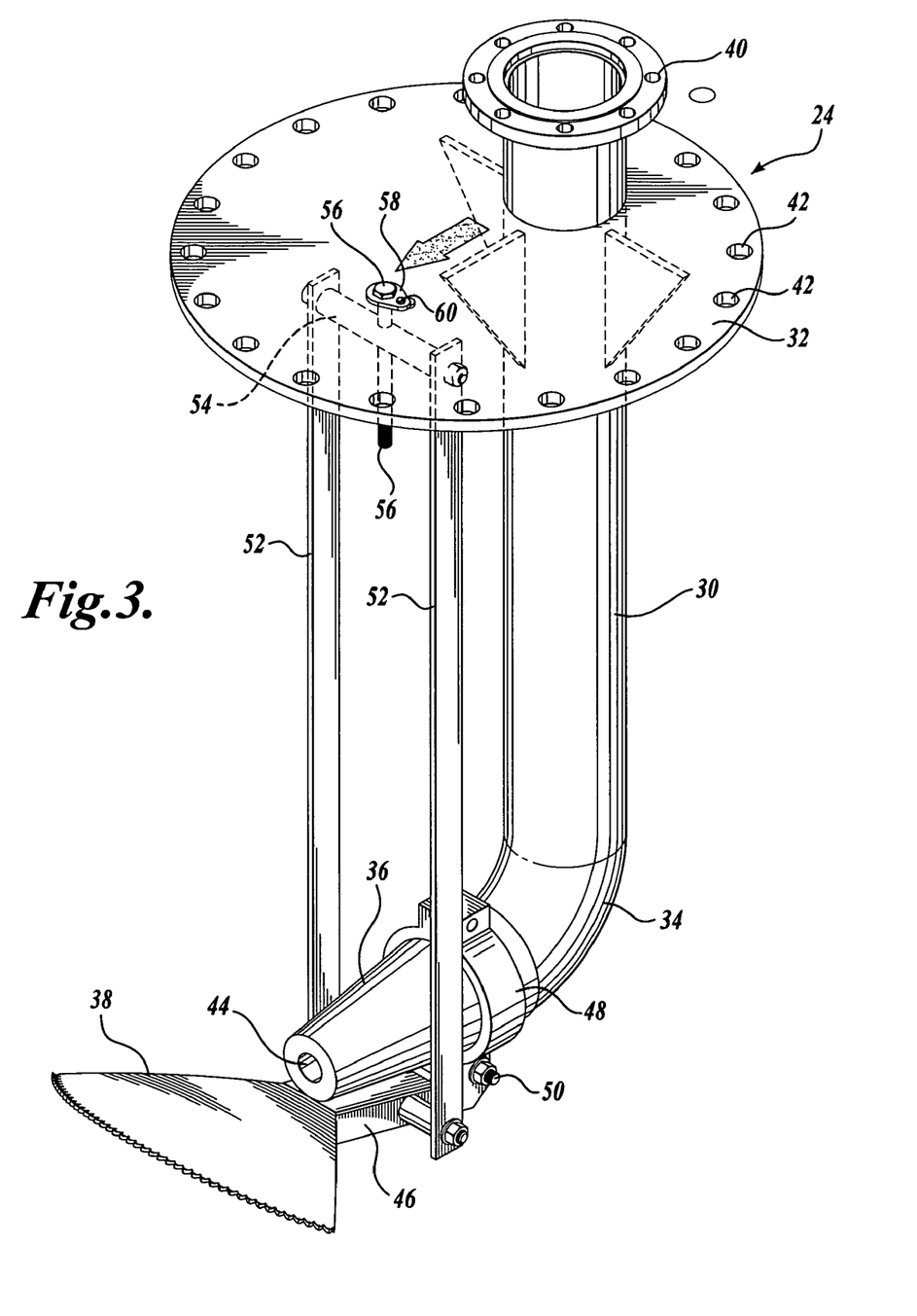
FIG. 3 is an enlarged top perspective of components of the system of FIG. 1, including a liquid projecting nozzle and splash plate toward the bottom of the figure.

With reference to FIG. 3, the diffuser 24 includes a standard coupling 40 to attach to the supply pipe 22 (FIG. 1). The upright inlet pipe 30 extends through the cover plate 32 which can have peripheral holes 42 for connection bolts or studs through the margin of the tank lid adjacent to the manhole. For "gas tight" installations, a gasket is interposed between the cover plate 32 and the lid, such as a ⅛ inch thick neoprene gasket ring. As noted above, the upright pipe 30 leads to the 90° elbow 34, and the outlet of the elbow is connected to the tapered nozzle 36. Although the nozzle outlet 44 is of substantially lesser diameter than the pipe 30 and elbow 34, nevertheless, the diameter at the outlet still is much larger than conventional spray nozzles or apertures so that the nozzle will not become clogged with rags, hair, fiber, or other thick, tough, stringy, or solid material from the tank.

Figure 4:
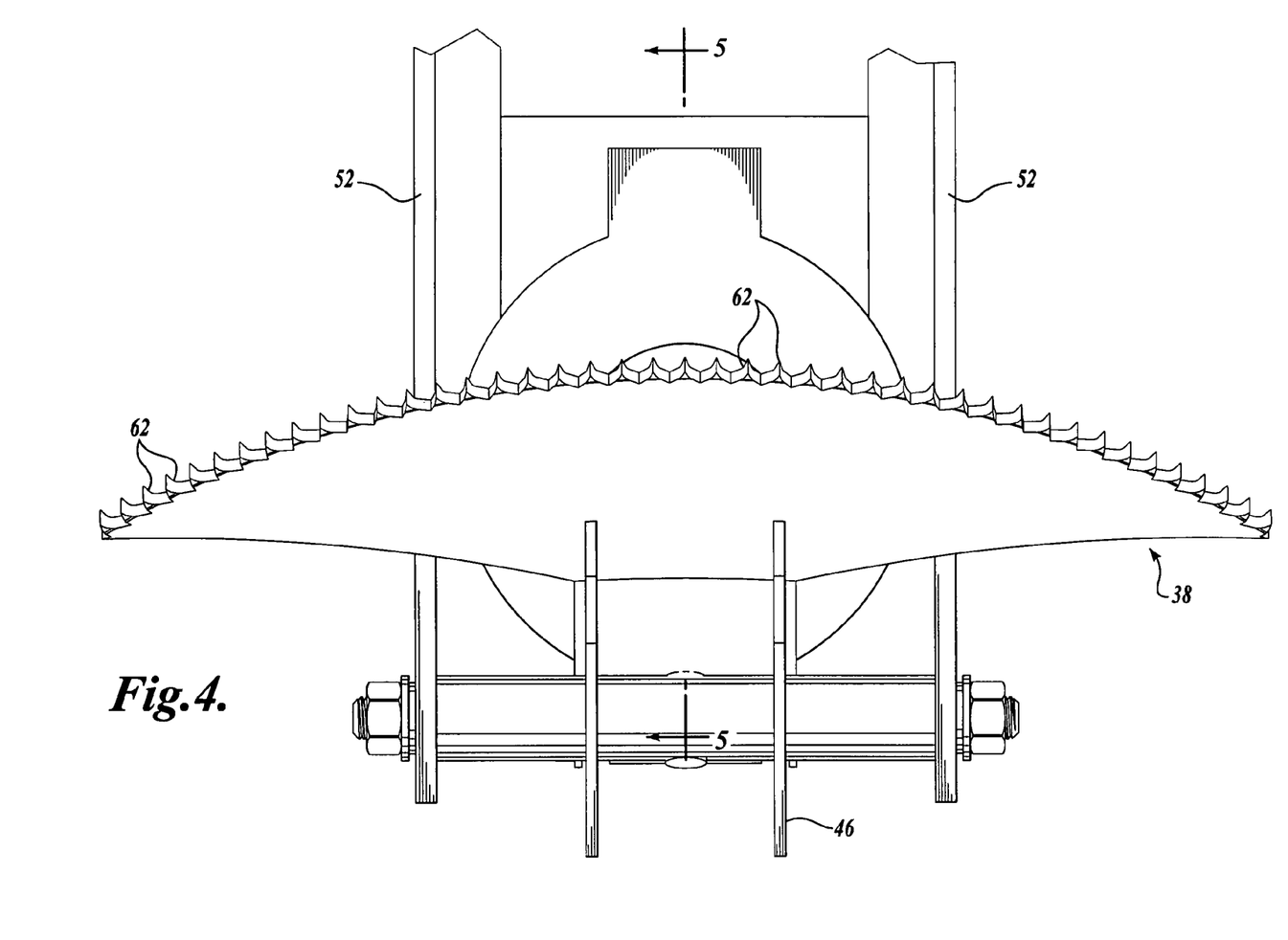
FIG. 4 is a further enlarged front end elevation of the splash plate and liquid nozzle of FIG. 3.
Figure 5:
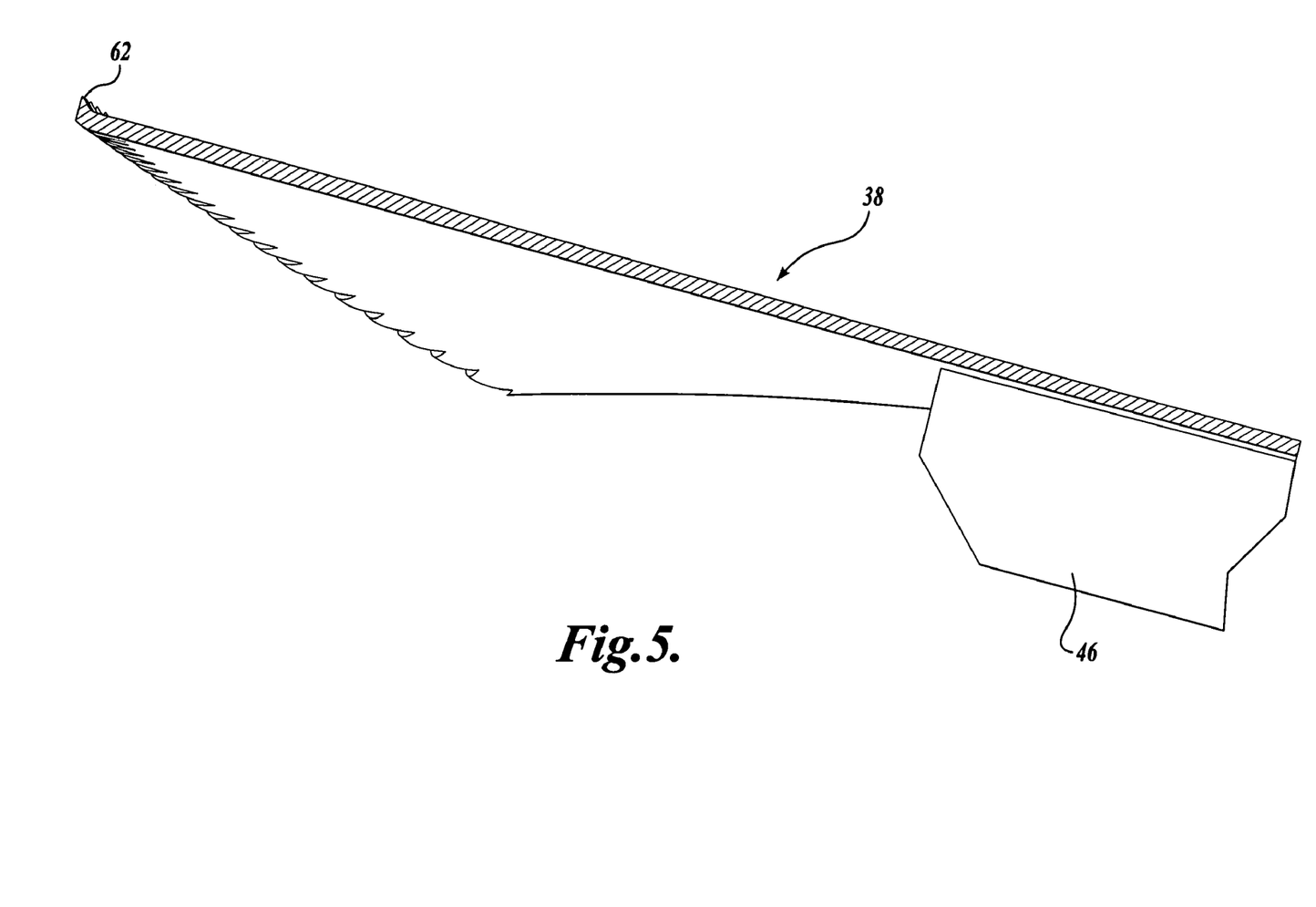
FIG. 5 is a fragmentary vertical section along line 5-5 of FIG. 4.

The splash plate or deflector 38, described in detail below with reference to FIGS. 4 and 5, is carried by a support arm 46 pivoted to the underside of the nozzle coupling 48 by a pivot pin or bolt 50. Upright adjustment arms 52 are pivotally attached to the support arm 46 and extend upward to a horizontal cross bar 54 spanning between the arms 52. Bar 54 has a threaded central hole for receiving an adjustment spindle or jack bolt 56 with an enlarged head at the top of the cover plate 32. A locking plate and bolt assembly 58, 60 can be carried at the underside of the head of the jack bolt 56. With the locking bolt 60 released, the jack bolt 56 can be turned to adjust the angle of the deflector 38. When the desired angle is reached, the locking plate and bolt 56 are fixed by reinserting the locking bolt. Tightening the locking bolt restores the gas tight connection.

With reference to FIGS. 4 and 5, the deflector 38 is a key component of the surface foam diffuser system in accordance with the present invention. As noted above, it is desired that the nozzle outlet be of substantial diameter to prevent clogging. It also is desired that the exit velocity of the stream be quite high in order to reach a sizeable area. The purpose of the deflector is to break up the stream from the nozzle into droplets and disburse the droplets over a long and wide area, while minimizing the height of the spray to minimize the headroom required inside the tank. Many different shapes and contours were tested, with the following constituting the current preferred embodiment:

The deflector plate 38 is angled upward from below the nozzle outlet at a small acute angle so that the horizontally directed stream of liquid from the nozzle is deflected upward without excessive loss of energy or a resulting high arc. A 10° to 20° angle of inclination, preferably about 15°, has been found to achieve the desired deflection.

The outer peripheral edge of the deflector is a circular arc centered at about the nozzle outlet, and of at least 90° angular extent, preferably at least about 120°. If the shape is too narrow, the spray and droplets fall off the sides of the plate in an uncontrolled manner. In this embodiment, the radius of the arc is about 14 inches, resulting in the maximum width of the "fan" being about 21 inches.

The outer arcuate edge is formed with "saw tooth" fingers 62 bent up relative to the inner portion of the plate, preferably at an angle of about 45°. The fingers or teeth are of a sharp "V" shape having a tip radius no greater than 0.06 inch, and a base radius between teeth no greater than 0.06 inch. The teeth are small and closely spaced which has been found to break up the stream and spread apart the spray of droplets. A simple deflector with no teeth tends to concentrate the spray pattern at a constant radius, whereas large teeth at mixed angles and sizes break up the spray pattern, but not much water falls within a 10-foot radius of the nozzle and the pattern is not evenly distributed. The small, sharp teeth achieve a more uniform pattern. In this embodiment, the teeth are about 0.625 inch long with a pitch (tip-to-tip) of about 0.575 inch, resulting in an included angle between adjustment tooth edges of about 50°.

Figure 6:
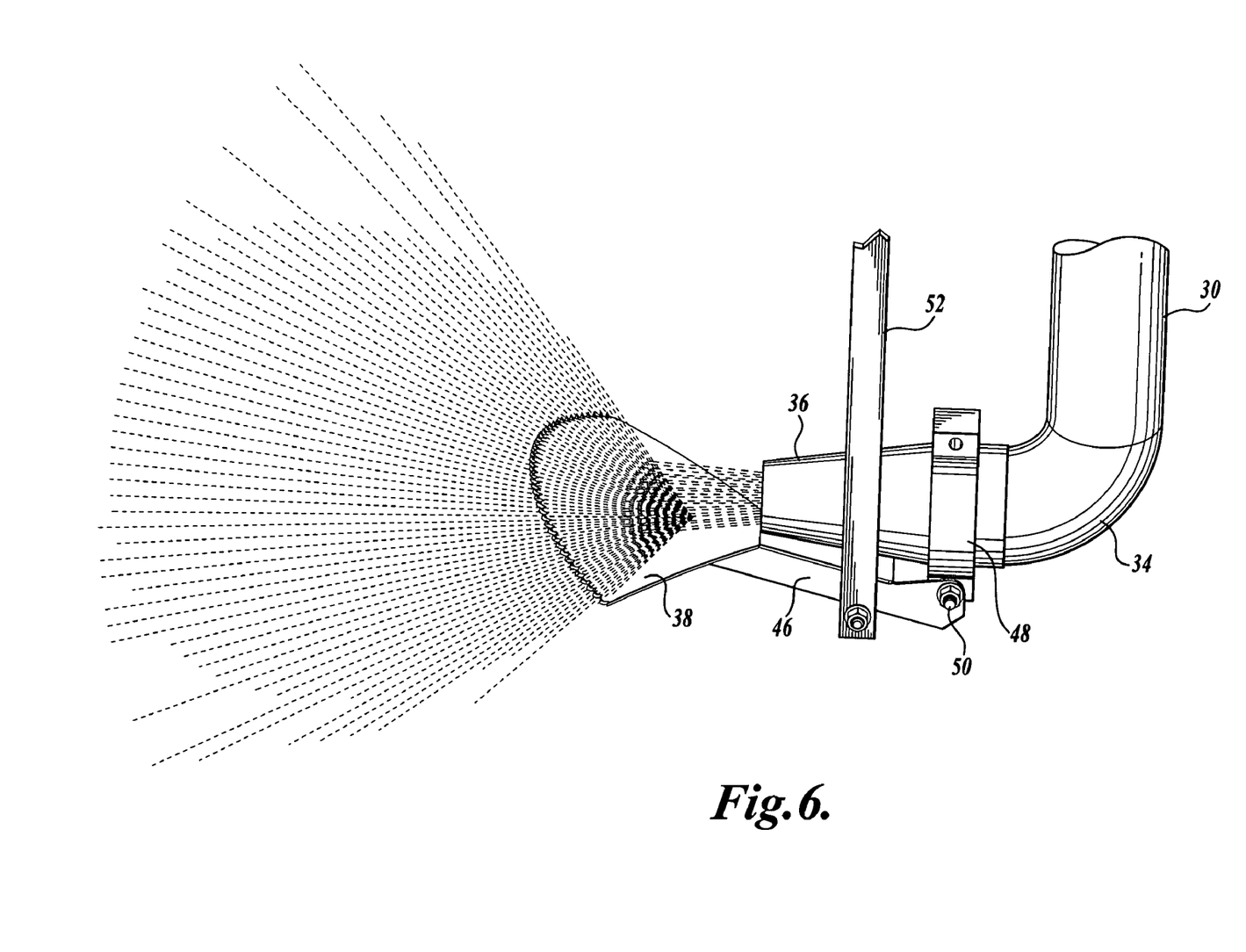
FIG. 6 is a fragmentary top perspective of the liquid nozzle and splash plate illustrating dispersion of liquid impinging on the plate.

As seen in FIG. 4, the plate portion of the deflector is not planar, but rather is curved about its center line at a radius of approximately 36 inches so that the outer corners droop downward about 2 inches with respect to the center of the deflector. The concave upper surface has been found to assist in disbursing the spray more evenly from side to side. FIG. 6 shows the action of the deflector for broadcasting droplets from the liquid steam from the nozzle 36.

Figure 7:
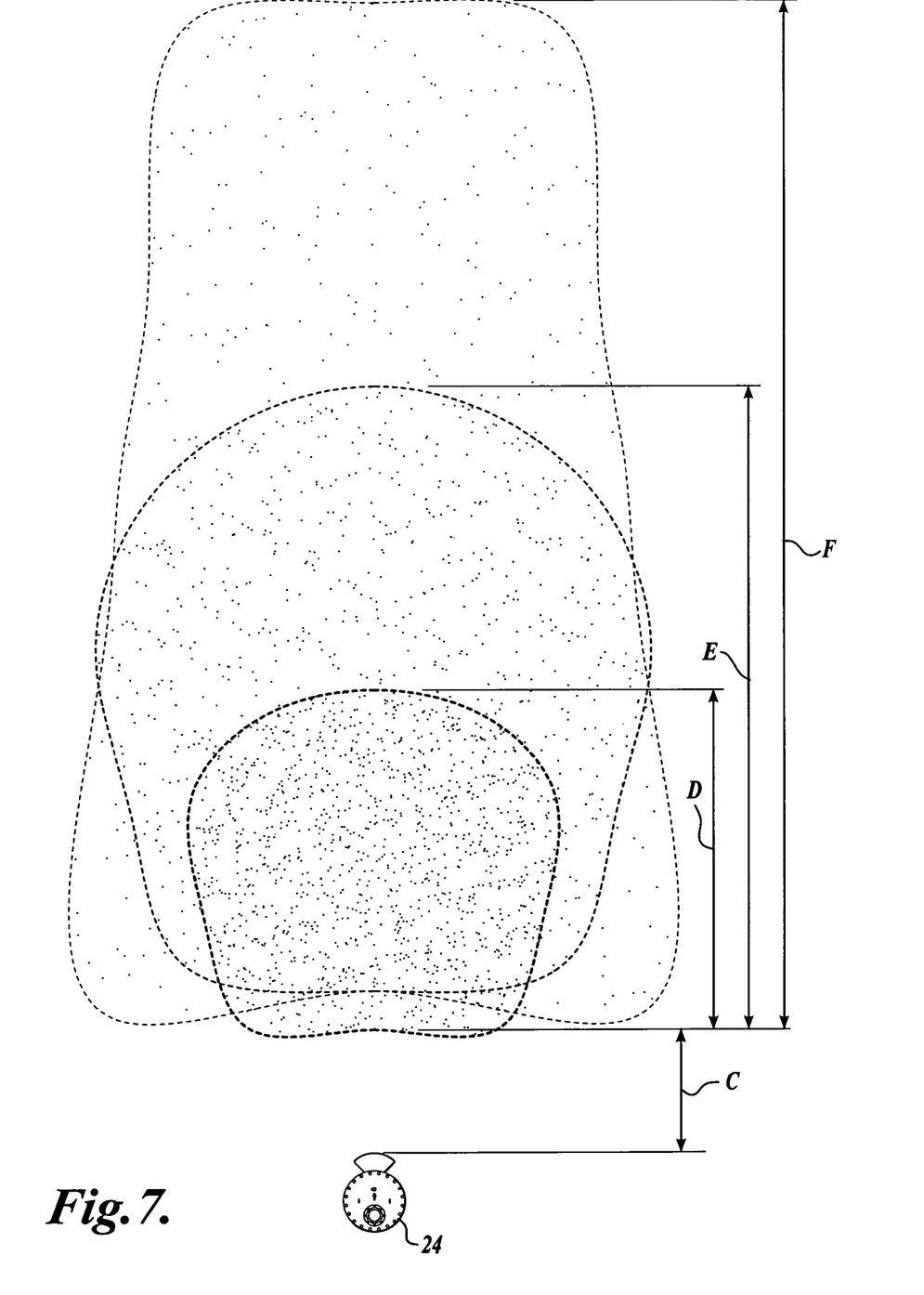
FIG. 7 is a diagrammatic top plan illustrating surface coverage of the surface foam diffuser system in accordance with the present invention under different operating conditions.

FIG. 7 illustrates the spray pattern achieved by the diffuser system in accordance with the present invention for each of three different volumetric nozzle outputs. For all three patterns, the nozzle was positioned approximately 1 foot above the liquid surface, and the regular, substantially uniform pattern of droplets would contact the surface at about 4 feet from the deflector (dimension C, shown in FIG. 7). All three embodiments used a nozzle exit diameter of 1.75 inches. For pump output of 320 gallons per minute (gpm), the output stream velocity was 42.7 feet per second (ft/s) requiring 34.5 feet total dynamic head (tdh) at the nozzle and resulting in the longest pattern, extending 33.5 feet (dimension F, shown in FIG. 7) by approximately 18 feet wide, with maximum head room of 4 feet required in the tank. At a lesser pressure (228 gpm; 30.4 ft/s; 18.4 ft tdh), the pattern extended about 21 feet (dimension E of FIG. 7) by a width of about 18 feet. At a still lesser pressure (168 gpm; 22.4 ft/s; 9.2 ft tdh), the pattern extended about 11 feet outward (dimension D of FIG. 7) by about 12 feet wide. In each case, the droplets were of fairly uniform size over a substantial area of the surface of liquid in the tank sufficient to break up foam bubbles of the liquid rotated in the tank.

While illustrative embodiments have been illustrated and described, it will be appreciated that various changes can be made therein without departing from the spirit and scope of the invention.

The invention claimed is:

1. A surface foam diffuser system for use with a tank, the diffuser system comprising:
   a liquid nozzle configured to be disposed about a top surface of a tank having at least partially liquid contents, the nozzle having an inlet for receiving pressurized liquid and an outlet for ejecting a liquid stream along a path directed toward one of either a center or a side of the tank; and
   a splash plate positioned adjacent to the nozzle outlet in the path of the liquid stream at an angle of inclination relative to the path of no more than 20°, the splash plate comprising a peripheral edge in the path of the liquid stream, the peripheral edge forming an obtuse circular arc;
   wherein the peripheral edge has a width and the nozzle outlet has a diameter, the width of the peripheral edge being in the range of about 3 to about 10 times greater than the outlet diameter.

2. The device of claim 1, wherein the angle of inclination is at least 10°.

3. The device of claim 1, wherein the angle of inclination is about 15°.

4. The device of claim 1, wherein the nozzle has an inside diameter and the inside diameter narrows from the inlet toward the outlet.

5. The device of claim 1, wherein the arc is at least 90 degrees.

6. The device of claim 1, wherein the arc is about 120 degrees.

7. The device of claim 1, wherein the arc has a radius of about 14 inches.

8. The device of claim 1, wherein the edge has a width of about 21 inches.

9. A surface foam diffuser system for use with a tank, the diffuser system comprising:
   a liquid nozzle configured to be disposed about a top surface of a tank having at least partially liquid contents, the nozzle having an inlet for receiving pressurized liquid and an outlet for ejecting a liquid stream along a path directed toward one of either a center or a side of the tank; and
   a splash plate positioned adjacent to the nozzle outlet in the path of the liquid stream at an angle of inclination relative to the path of no more than 20°, the splash plate comprising a peripheral edge in the path of the liquid stream, the peripheral edge forming an obtuse circular arc;
   wherein the peripheral edge of said splash plate is serrated.

10. The device of claim 9, wherein the peripheral edge contains "v-shaped" serrations.

11. The device of claim 10, wherein the serrations are angled at 45 degrees relative to an upper surface of the splash plate.

12. The device of claim 10, wherein the serrations are evenly distributed around the peripheral edge.

13. The device of claim 12, wherein the serrations having a tip radius no greater than 0.06 inches.

14. A surface foam diffuser system comprising:

a tank having at least partially liquid contents;

a nozzle disposed above a top surface of the tank contents, the nozzle having an inlet for receiving pressurized liquid and an outlet directed generally inward toward a center of the tank for ejecting a stream of pressurized liquid along a projected path;

a splash plate positioned adjacent to the nozzle at a location in the projected path of the liquid stream; and a support mechanism attached to the splash plate to permit movement of the splash plate, the support mechanism comprising:

a support arm attached to the splash plate; and an adjustment mechanism coupled at one end to the support arm to allow pivoting movement of the support arm to change the angle of inclination of the splash plate, the adjustment mechanism being attached at another end to a bolt assembly.

15. The device of claim 14, wherein the bolt assembly includes a threaded central hold which can be turned to adjust the angle of inclination of the splash plate.

* * * * *